READ-OUT SYSTEM

Filed March 26, 1956

INVENTOR,
Fred N. Schwend
BY
Fred N. Schwend
ATTORNEY.

READ-OUT SYSTEM

INVENTOR,
Fred N. Schwend
BY
ATTORNEY.

INVENTOR,
Fred N. Schwend
BY Fred N. Schwend
ATTORNEY.

Jan. 16, 1962

F. N. SCHWEND

READ-OUT SYSTEM 3,017,080

Filed March 26, 1956

5 Sheets-Sheet 4

INVENTOR,
Fred N. Schwend

BY

Fred N. Schwend

ATTORNEY.

Jan. 16, 1962 F. N. SCHWEND 3,017,080

READ-OUT SYSTEM

Filed March 26, 1956 5 Sheets-Sheet 5

INVENTOR,
Fred N. Schwend

BY

Fred F. Schwend

ATTORNEY.

United States Patent Office 3,017,080
Patented Jan. 16, 1962

3,017,080
READ-OUT SYSTEM
Fred N. Schwend, El Monte, Calif., assignor to Clary Corporation, San Gabriel, Calif., a corporation of California
Filed Mar. 26, 1956, Ser. No. 573,680
4 Claims. (Cl. 235—60)

This invention relates to computing and/or data processing equipment and has particular reference to equipment of this type which is adapted to record or otherwise utilize information transmitted thereto in coded form.

Where input data is transmitted to equipment of the above type from punched tape, magnetic tape, punched cards, or the like, it is generally desirable to transmit such data in coded form in order to reduce the number of transmission units, i.e. transmission wires, channels, frequencies, etc. Generally, also such data is recorded in coded form on record media, such as punched tape, punched cards, magnetic tape or the like in order to conserve available space reserved for recording such data.

A principal object of the present invention is to provide a recording or registering machine embodying mechanical translation devices for translating input data from a coded form to a true form.

Another object is to provide a machine of the above type in which no time is lost in effecting translation of input data from coded to true form.

Another object is to provide an electrically controlled recording and/or registering machine of the ten key type having a minimum amount of control circuitry for entering amounts therein.

Another object is to provide a relatively simple and inexpensive attachment for effecting remote control of a recording and/or registering machine of the ten key type.

The manner in which the above and other objects of the invention are accomplished will be readily understood on reference to the following specification when read in conjunction with the accompanying drawings, wherein.

Figures 1, 9:
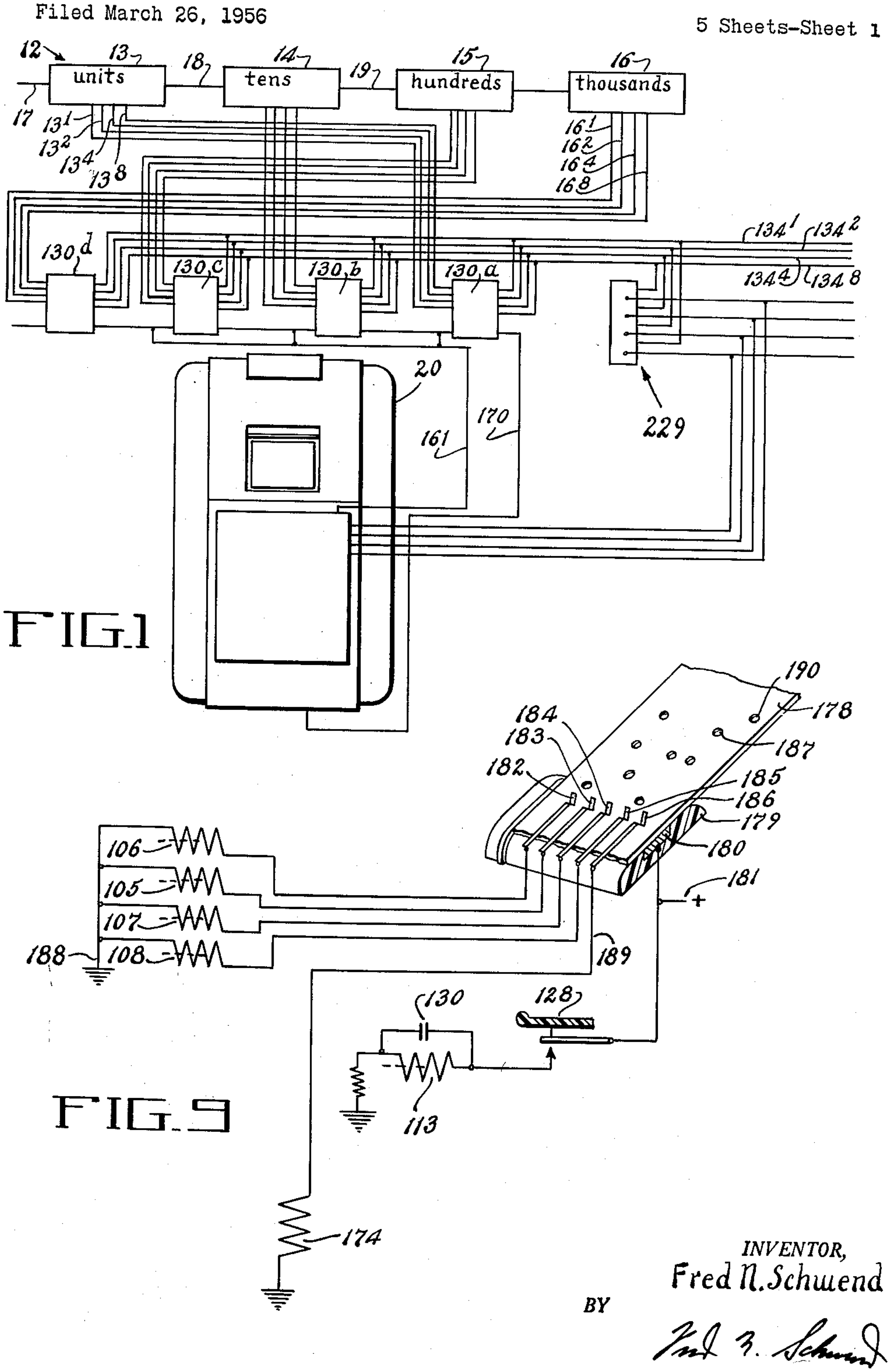
FIG. 1 is a schematic view of a combined pulse actuated electronic counter and a read-out system embodying a preferred form of the present invention.
FIG. 9 is a schematic view illustrating the control of the read-out system by a punched tape.

Referring to FIG. 1 in particular, the read-out system shown therein is illustrated as associated with an electronic counter, generally indicated at 12, of the binary coded decimal type. The counter is illustrated as comprising four binary type counter decades 13, 14, 15 and 16.

The input circuit 17 of the units counter decade 13 is adapted to be connected to a suitable source of pulses to be counted. The overcarry circuit 18 of the units decade is connected to the input circuit of the tens counter decade 14. Likewise, the overcarry circuit 19 for the decade 14 is connected to the input circuit for the decade 15, etc. Obviously, the counter may be expanded to include any desired number of decades within the capacity of the read-out machine which is generally indicated at 20.

Since the details of the counter are not pertinent to an understanding of the present invention, they have been omitted for the purpose of brevity. However, reference may be had to the co-pending application of J. L. Lindesmith, S.N. 259,568, filed December 3, 1951 (Pat. No. 2,770,415 issued Nov. 13, 1956), for a complete disclosure of a counter which may be utilized in connection with the present invention. Suffice it to say, however, that each counter decade has an output circuit comprising four leads, i.e. $\mathbf{13^1}$, $\mathbf{13^2}$, $\mathbf{13^4}$ and $\mathbf{13^8}$ which represent by distinct voltage conditions (and respectively from right to left) the decimal digit values 1, 2, 4 and 8. That is, when the binary decade 13 is in a condition representing 0, all of the output leads thereof are at a high potential, representing the binary term 0000. When the decade registers a 1, the lead 13' is at a low potential and the remaining leads are at a high potential to represent the binary term 0001.

The following table represents the binary terms registered by the output leads for each decimal digit, bearing in mind that a binary 0 is represented by a high potential condition and a binary 1 is represented by a relatively low potential condition.

| Decimal digit: | Binary term |
|---|---|
| 1 | 0001 |
| 2 | 0010 |
| 3 | 0011 |
| 4 | 0100 |
| 5 | 0101 |
| 6 | 0110 |
| 7 | 0111 |
| 8 | 1000 |
| 9 | 1001 |

*Read-out machine*

The read-out machine, generally indicated at 20, FIG. 1, and shown in certain details in FIGS. 2 to 6, is based on the well-known Clary ten key adding machine. The latter is disclosed and claimed in the copending application of R. S. Mark et al., Serial No. 506,486, filed May 6, 1955 (Pat. No. 2,989,231 issued June 20, 1961). Other details of the machine are disclosed in the R. E. Boyden Patent No. 2,583,810, issued on January 29, 1952 and the E. P. Drake Patent No. 2,472,696, issued on June 7, 1949.

Since the basic structure of the machine is disclosed in the above pending application and patents and is found in the commercially available Clary ten key adding machine, only those portions which form part of or relate directly to the present invention will be disclosed herein in detail.

Figure 2:
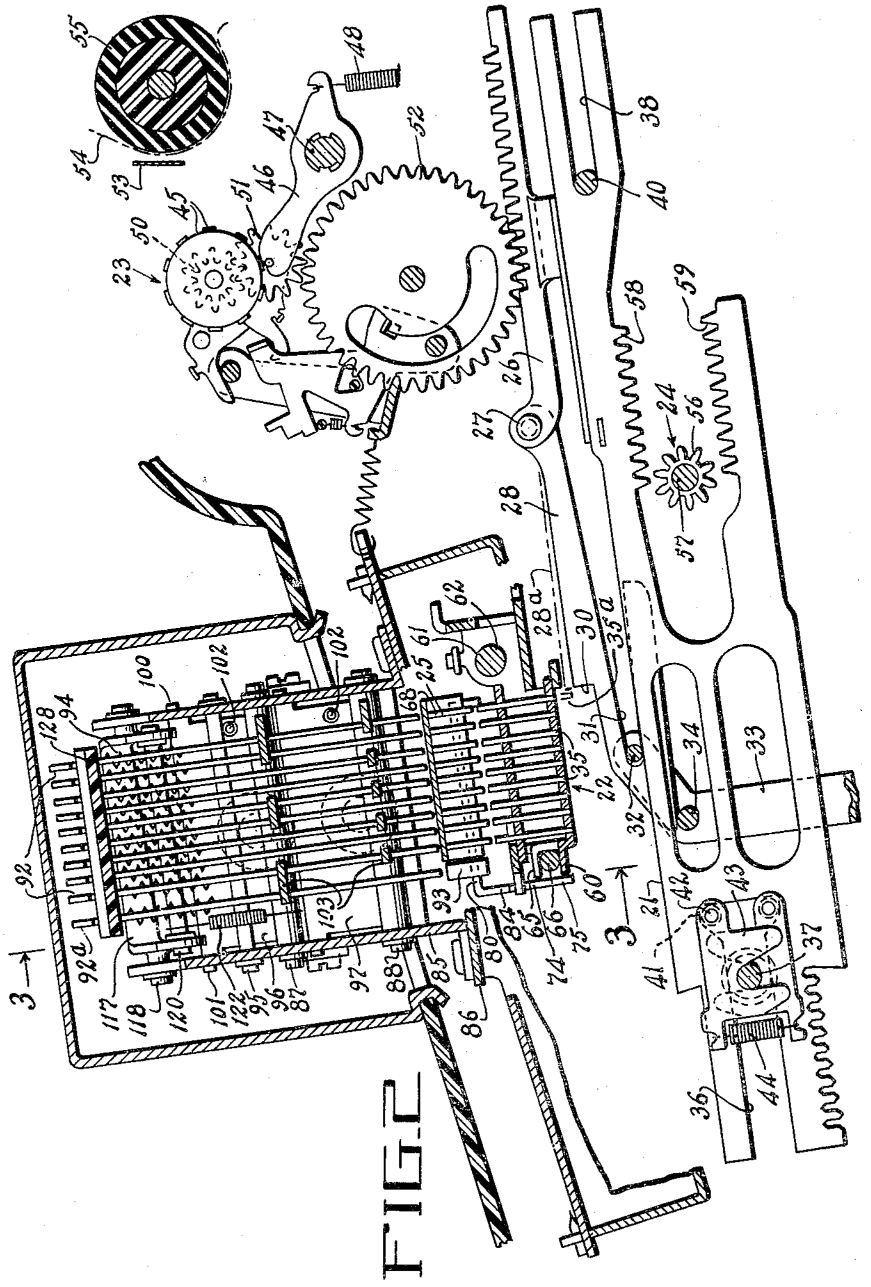
FIG. 2 is a longitudinal sectional view through the read-out machine embodying an accumulator and printing instrumentalities.

In general, the machine comprises a plurality of reciprocable differentially operable drive racks 21, FIG. 2, which are operable under control of a pin carriage, generally indicated at 22, to differentially set a printing mechanism, generally indicated at 23, and to enter amounts into an accumulator, generally indicated at 24.

Amounts registered by the counter 12 are entered into the machine accumulator 24 and are printed by the printer 23 by automatically depressing appropriate ones of nine bails 25 (FIGS. 2 to 4) and an escapement bail 76 which range in digital value from "0" to "9." The bails are usually depressed or rocked in serial fashion, the highermost denominational digits of an amount being entered first and the remaining digits entered successively.

Referring to FIG. 2, each rack 21 has integrally secured thereto an offset rack section 26 having pivoted thereto at 27 a rack stop element 28. The latter stops have stop shoulders 30 formed thereon and are provided with slots 31 which embrace a guide bail rod 32 carried on bail arms 33. The latter bail is suitably pivoted at 34 to frame parts (not shown) and during machine cycle is rocked counterclockwise to raise the rack stops slightly into alternate positions indicated by the dotted lines 28*a*, so as to locate the stop shoulders 30 in locations to be arrested by depressed ones of a series of stop pins 35 carried by the pin carriage 22.

Each of the drive racks 21 has an elongated slot 36 therein which slideably embraces a rack drive shaft 37 whereby to support the forward end of the rack. The other end of each rack is provided with a second slot 38 slideably supported on a fixed cross shaft 40.

The slot 36 in each rack terminates in opposed notches 41 normally engaged by rollers 42 carried by drive elements 43. The latter are pivotally mounted on the shaft 37 and are spring urged in opposite directions relative to each other by a tension spring 44 extending between forwardly extending tails thereon.

During a machine cycle, the shaft 37 is suitably moved fore and aft of the machine (to the left in FIG. 2 and then returned) by means not shown. Consequently, the drive elements 43 will be effective to yieldably drive each rack until a stop shoulder 30 on the associated rack stop element 28 will engage a depressed one of the stop pins 35. The associated rack will thereby be arrested and as the shaft 37 continues its travel, the rollers 42 will ride out of their respective notches 41, thus breaking the connection between the shaft and the rack. The rollers 42 will then merely move along the edges of the slot 36.

The printer 23 comprises a plurality of printing wheels, one of which is shown at 45, associated with respective ones of the drive racks 21. Each wheel is provided with a series of type characters around its periphery ranging from "0" to "9." The wheels 45 are so entrained with their racks that they will print a digit corresponding to the numerical value of the stop pin depressed in the associated order or corresponding to the numerical position to which the rack is moved in its forward or leftward stroke. Each printing wheel is rotatably mounted on a separate arm 46 which is loosely keyed on a printer control shaft 47 and spring urged clockwise by tension spring 48. Each printing wheel has integrally secured thereto a gear 50 which meshes with a gear 51 also rotatably mounted on its arm 46. The shaft 47 is normally positioned to hold the arms 46 in position to maintain the gears 51 in mesh with aligned idlers 52 which, in turn, are maintained in constant mesh with the offset rack sections 26.

At approximately the mid-point in the machine cycle, and after the racks have differentially advanced to positions limited by depressed ones of the stop pins 35, the printer control shaft 47 is rocked clockwise by suitable mechanism (not shown), permitting the springs 48 to rock the printer arms 46 clockwise and thus carry the print wheels rearwardly into contact with a printing ribbon 53 and a paper tape 54 which is guided around a platen 55, so as to print the number registered on the wheels onto the paper. Thereafter, and before the racks are returned from their forwardly advanced positions, the shaft 47 is rocked counterclockwise to return the various type wheel arms 46 to their illustrated positions wherein the gears 51 are remeshed with the idler gears 52.

Since the accumulator 24 does not in itself comprise the invention, it will be described only briefly.

The accumulator comprises a plurality of accumulator gears 56 independently and rotatably mounted on an accumulator shaft 57. The shaft 57 is normally held in its neutral position illustrated in FIG. 2 wherein the various gears 56 are located out of mesh with rack sections 58 and 59 formed on the associated racks 21. During an additive operation, the accumulator is raised to mesh the accumulator gears with the upper rack sections 58 whereby the gears will be rotated in a counterclockwise direction during the subsequent forward rack movement. Thereafter, the accumulator will be returned to its illustrated neutral position where it is maintained during the return of the racks. During subtractive operations, the accumulator is lowered to mesh the accumulator gears 56 with the rack gear sections 59 on the racks so that during subsequent forward rack movement the gears will be differentially advanced in a clockwise direction.

Describing now the pin carriage and its controls, the pin carriage 22 comprises a box frame 60, the top and bottom walls of which are provided with a field of aligned slots. Slideably mounted in these slots are the various stop pins 35. The stop pins are located in rows extending longitudinally of the machine, each row comprising nine pins spaced apart distances equal to the increments of advancement of the various racks.

The pin carriage is guided for lateral movement into cooperative relation with different ones of the racks 21. For this purpose, the end walls 61 of the pin carriage have bearing holes formed therein, slideable along a support shaft 62 which is suitably supported by the side frame members 63 and 64 (FIG. 3) of the machine. At its forward end, the pin carriage has a pair of spaced ears 65 extending therefrom and embracing a second support shaft 66.

The various stop pins 35 are normally held in their raised position, shown in FIG. 3, by suitable detent springs (not shown) and are arranged to be depressed by different ones of the aforementioned bails 25, FIGS. 3 and 4, as will be described presently.

The various bails 25 are nested together and are individually and pivotally mounted on a cross rod 67 suitably supported by the machine frame. The rearmost legs of the various bails 25 terminate in aligned hammer projections 68 located over respective ones of the stop pins 35 in an aligned row in the pin carriage.

Figure 3:
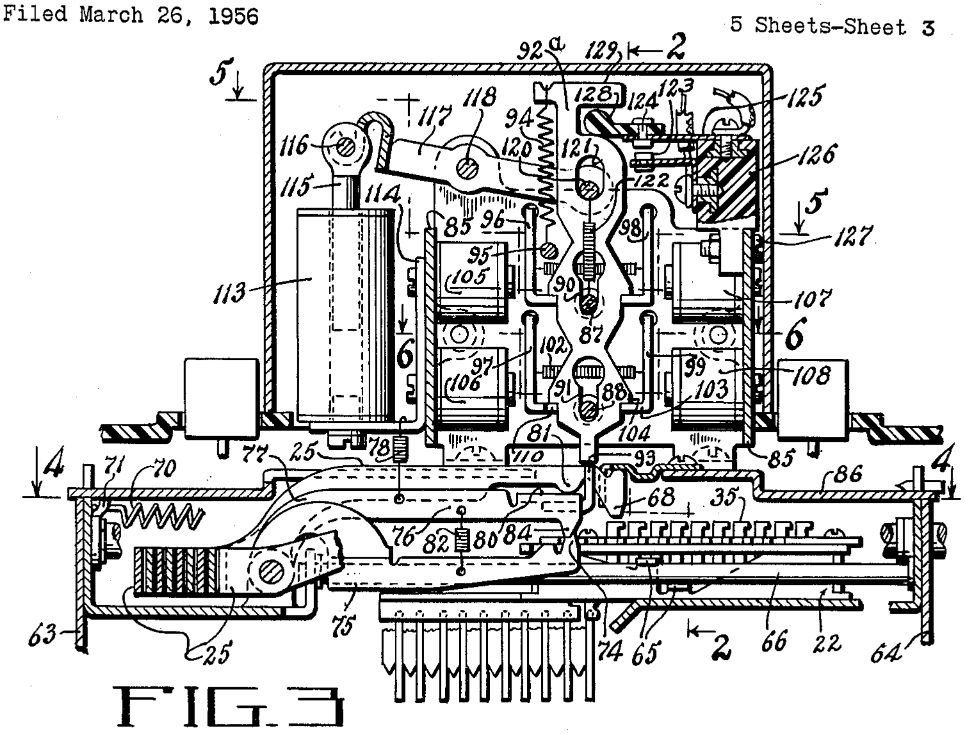
FIG. 3 is a transverse sectional view through the read-out machine and is taken substantially along the line 3—3 of FIG. 2.

The various bails 25 are normally held in their raised positions shown in FIG. 3 by individual springs (not shown). However, upon lowering of any bail, its hammer portion 68 will engage and depress an aligned stop pin 35 into its rack arresting position partly shown by the dotted lines 35*a* in FIG. 2.

Figure 4:
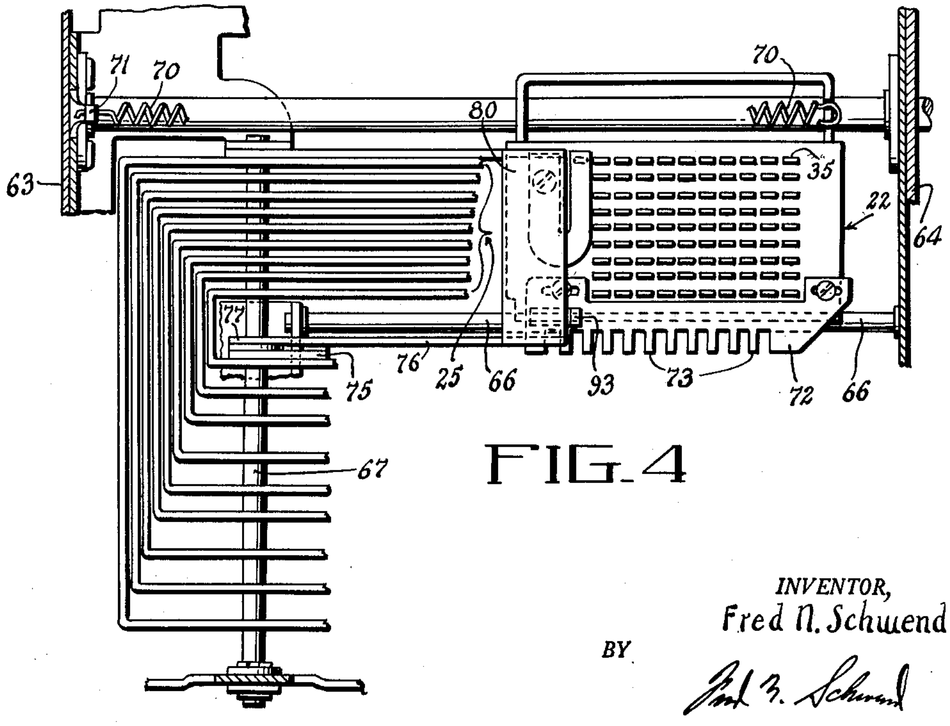
FIG. 4 is a sectional plan view illustrating the pin carriage and a portion of the setting devices for the pins thereof and is taken substantially along the line 4—4 of FIG. 3.

Normally, the pin carriage is maintained in a rightmost position relative to the racks as shown in FIGS. 3 and 4 against the action of a spring 70 tensioned between the pin carriage and a part 71 attached to the left hand machine frame plate 63. In this position, the left hand row of stop pins 35 are located directly below aligned hammer portions 68 of the various bails 25. For this purpose, an escapement mechanism is provided which enables the pin carriage to be stepped laterally toward the left from one denominational order to the next as an incident to lowering of any of the bails 25.

Describing now the escapement mechanism and referring particularly to FIGS. 3 and 4, a toothed plate 72 is suitably secured to the top plate of the pin carriage 60 and is provided with a series of teeth 73 engageable by a tooth 74 of an escapement arm 75. The latter is pivotally supported on the aforementioned shaft 67. A bail 76 cooperates with the escapement arm 75 and has its legs 77 also pivotally supported on the shaft 67.

A tension spring 78 normally holds the bail 76 in its upper illustrated position wherein the bail portion 80 thereof engages depending humps 81 formed on the various bails 25. A tension spring 82 is tensioned between the bail 76 and escapement arm 75 whereby to normally hold the escapement arm in its upper position shown, wherein it maintains its arresting tooth 74 in engagement with one of the teeth 73 of the pin carriage.

When any one of the bails 25 is lowered, as will be described hereinafter, and as the hammer portion 68 thereof depresses a corresponding pin in the pin carriage, its hump 81 will rock the escapement bail 76 downwardly, causing a tooth 84 thereof to lower the escapement arm 75 and thus disengage its tooth 74 from the adjacent one of the teeth 73 on the pin carriage. Accordingly, the spring 70 will be effective to advance the pin carriage to the left a slight amount until the aforesaid tooth 73 engages the tooth 84. As the bail 25 is subsequently allowed to raise, the spring 78 will be effective to return the escapement bail upward to its normal illustrated position, removing the tooth 84 from engagement with the adjacent tooth 73 and thus permitting the spring 82 to return the escapement arm 75 to its upper position wherein the tooth 74 will rise into the path of the next succeeding tooth 73. The pin carriage will therefore have advanced from one denominational position to the next relative to the racks.

According to the present invention, means under control of the various counter decades 13, 14 and 15 and 16 are provided for sequentially lowering different ones of the bails 25 so as to set up in the pin carriage, by depression of appropriate pins 35, a decimal representation of the amount registered in binary coded form in the counter.

For this purpose a box frame 85, FIGS. 2 to 6, inclusive, is suitably mounted on top of a substantially horizontally extending plate 86 which is, in turn, suitably secured to the side frame plates 63 and 64. The frame 85 supports a pair of spaced cross rods 87 and 88 which are slideably embraced by vertically extending slots 90 and 91, respectively, formed in the ten actuator slides 92. Nine of the latter slides are located directly over rearwardly located legs of the nine bails 25, while the tenth slide **92*a*, representing the digit "9" is located directly over a tab 93 suitably secured to the escapement bail 76**.

The various slides 92 and **92*a* are urged downwardly by individual springs 94 extending between the same and a stationary cross rod 95 mounted on the frame 85. The slides are normally maintained in their upper illustrated positions by one or more swinging latches 96, 97, 98 and 99**.

The swinging latches are located on opposite sides of the slides 92 and are each provided with trunnion bearing portions 100 and 101 pivotally supported in bearings formed in the side walls of the box frame 85.

Opposite ones of the swinging latches are spring urged inwardly toward the slides by tension springs 102 extending therebetween whereby to normally locate latching ledges 103 thereon under associated latching shoulders 104 formed on the slides 92, there being four such shoulders on each slide.

Four electromagnets 105, 106, 107 and 108 are suitably secured to the box frame 85 in cooperative relation with individual ones of the swinging latches 96, 97, 98 and 99, respectively. Each magnet, when energized, is effective to swing its latch outwardly sufficiently to clear the associated stop shoulders on all of the actuator slides.

Figure 5:
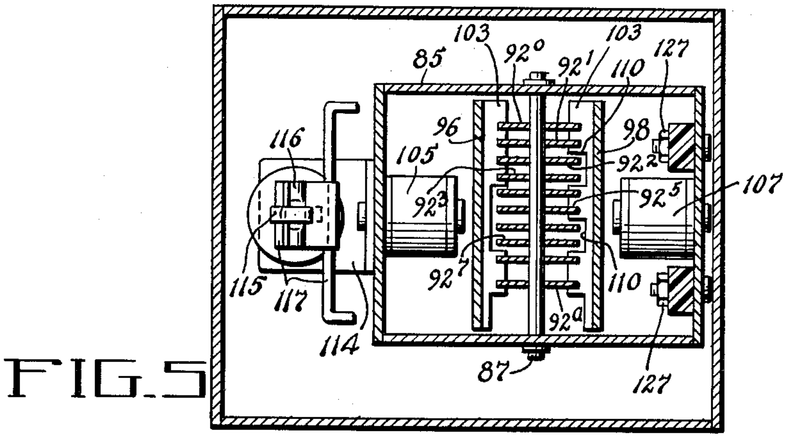
FIG. 5 is a sectional plan view taken substantially along the line 5—5 of FIG. 3.
Figure 6:
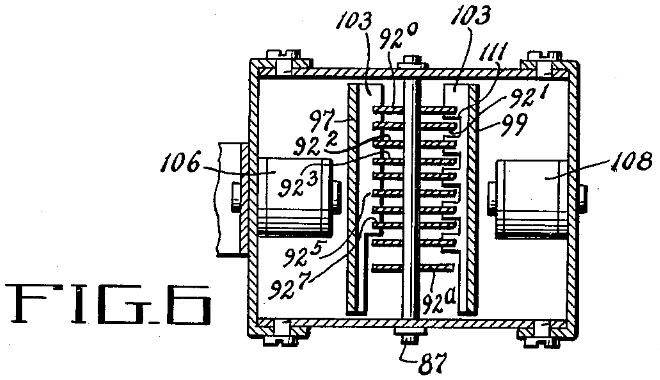
FIG. 6 is a sectional plan view taken substantially along the line 6—6 of FIG. 3.
Figure 7:
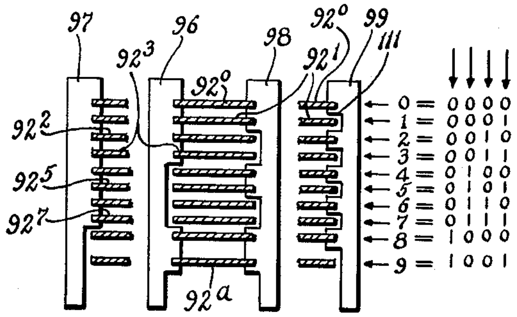
FIG. 7 is a schematic view illustrating the relationship between the different swinging slide latches and the actuator slides.

Referring to FIGS. 5, 6 and 7 in particular, it will be noted that the latching ledges 103 of the various swinging latches have cutout portions, i.e. 110, opposite certain of the actuator slides whereby to clear the respective shoulders 104 of such slides even when latches are in normal latching positions, as shown in the above figures.

The cutout portions are arranged in accordance with the binary-decimal relationships for the digits ranging from "0" to "9" as indicated at FIG. 7 and in accordance with the aforementioned table of binary-decimal terms.

It should be also noted at this point that the four electromagnets 105 to 108 will be energized in accordance with the four digits of any binary term, a binary "0" being represented by conduction of current through the electromagnet and a binary "1" being represented by nonconduction of current.

Therefore, the "0" bail setting slide 92⁰ is normally held by all four latches 96 to 99 and therefore requires the release of all such latches in order to set a "0" stop pin. Although in this case, all the other slides would be correspondingly released to set all other stop pins in the same row, such would have no effect. The "0" pin would prevent any substantial movement of the aligned rack regardless of the fact that all other pins are set. On the other hand, it will be noted that the latch 99 has a cutout portion 111 opposite the associated latching shoulder on the "1" bail setting silde 92¹. Therefore, upon receipt of a binary "0001" representation, corresponding to the decimal digit "1," only the three latches 96, 97 and 98 will be released. Accordingly, the "0" slide 92⁰ will be held by the latch 99 but the "1" slide 92¹ will be released to set the "1" stop pin. Here also, certain additional ones of the actuator slides, i.e. 92³, 92⁵ and 92⁷ will be releasd to set the corresponding stop pins. However, the latter, as before, have no effect since the "1" stop pin will control positioning of the aligned rack.

Again, upon receipt of a binary "0011" representation, corresponding to the decimal digit 3, only the two latches 96 and 97 will be actuated to release the actuator slide 92³ to set the "3" stop pin. It will be noted that the lower valued slides 92⁰, 92¹ and 92² will be held up so that the "3" stop pin will be controlling. Here again, although the actuator slide 92⁷ is released to set the "7" stop pin, this will have no effect on the positioning of the rack controlled by this row of stop pins.

It will be noted upon inspection of FIG. 7 that the foregoing conditions will prevail for all possible binary terms from"0001" to "1001" corresponding to the decimal digits "0" to "9," respectively.

Means are provided for returning one or more of the actuator slides 92 to their upper illustrated positions after the same have been released to set the corresponding stop pins 35. For this purpose, a resetting solenoid 113 is attached to a bracket 114 mounted on the box frame 85. The armature 115 of the solenoid is pivotally connected at 116 to a bail 117 pivotally supported at 118 on the sides of the frame 85. The bail 117 carries a cross rod 120 which extends through openings 121 in all of the slides 92. The bail is normally held in its position shown in FIG. 3 by a spring 122 tensioned between the bail rod 120 and the cross rod 87. However, upon energization of the solenoid 113 its armature will be effective to rock the bail 117 counterclockwise and thus raise any or all of the actuator slides to the upper limit of the travel where they may be latched by their various swinging latches 96 to 99, inclusive.

The means for energizing the solenoid 113 comprises a switch actuated by one or more of the slides 92 when the latter is or are released by the swinging latches. This switch comprises a stationary contact 123 and a movable contact 124, the latter being carried by a flexible blade 125. Both the stationary contact 123 and blade 125 are secured to a block 126 of insulating material which is secured by screws, one of which is shown at 127, to the frame 85. A tip 128 of insulating material is suitably secured to the movable blade 125 and underlies lateral projections 129 on all of the actuator slides, whereby release of one or more of such slides deflect the blade 125 to close the contacts 123 and 124.

Figure 8:
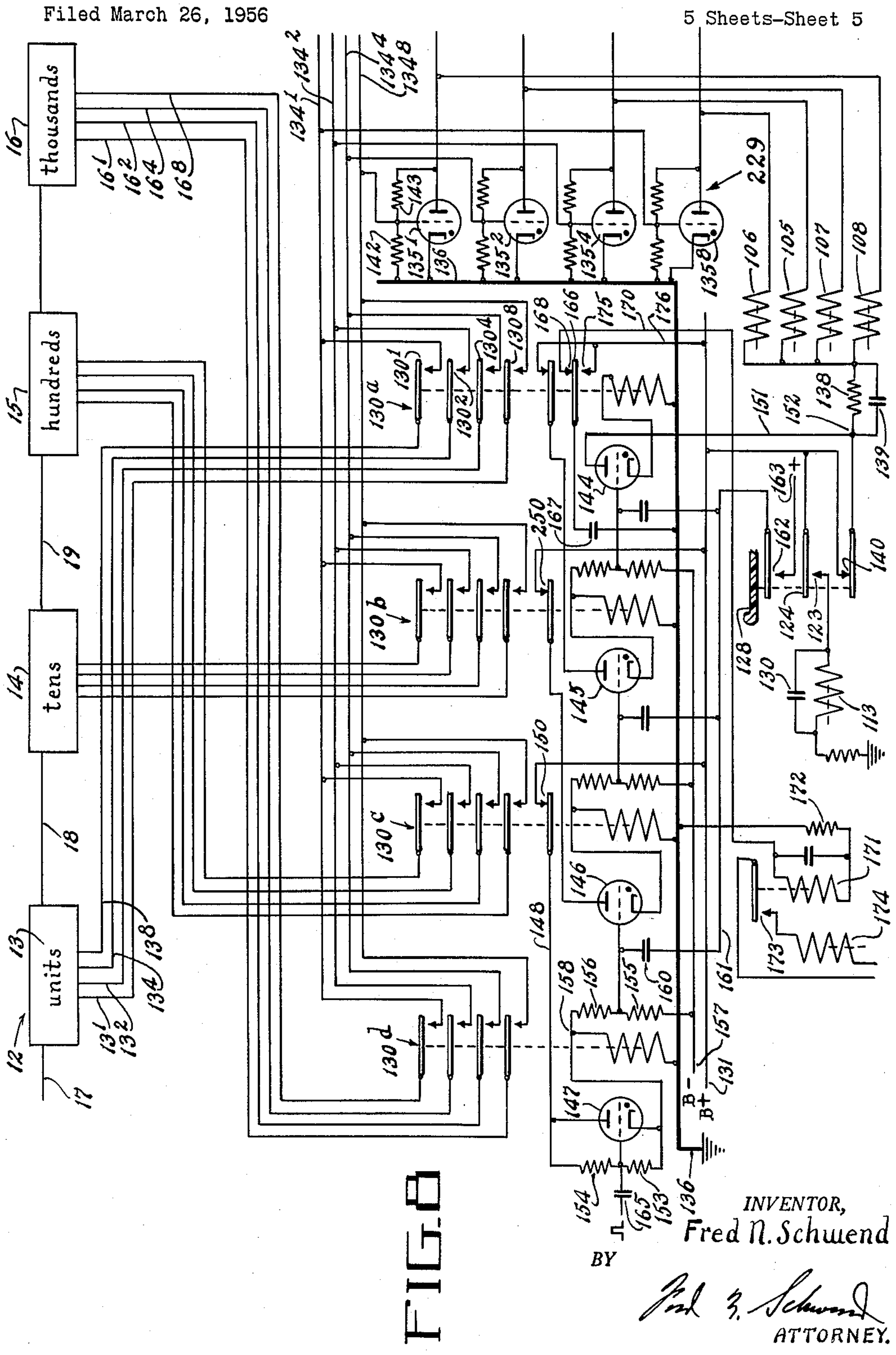
FIG. 8 is a circuit diagram illustrating the control of a read-out system by the electronic counter.

As shown in FIG. 8, a condenser 130 is connected across the terminals of the solenoid coil 113 which, in turn, is connected in series with the contacts 123 and 124 between ground and a conductor 131 of positive potential. The resultant LC circuit comprising condenser 130 and the coil 113 will effectively delay energizing of solenoid 113 sufficiently to enable one or more of the actuator slides to complete their downward movement even though the contacts 123 and 124 close during such downward movement.

Describing now the means for transferring information from the various counter decades sequentially to the read-in machine so as to enter the same in decimal value, reference is hereby had particularly to FIG. 8.

The four output leads 13¹ to 13⁸ of the units counter decade 13 are connected to four movable make contacts $130^1$, $130^2$, $130^4$ and $130^8$, respectively, of a units relay 130*a*. The output leads of the remaining decades 14, 15 and 16 are connected in similar manners to make contacts of relays 130*b*, 130*c*, and 130*d*, respectively.

The mating stationary contacts of the different relays are connected in parallel to four bus lines $134^1$, $134^2$, $134^4$ and $134^8$. The latter bus lines are connected to the igniters of a group 229 of respective gas filled, thyratron or ignition type tubes $135^1$, $135^2$, $135^4$ and $135^8$. An example of such tube is that commercially available under the name "RCA No. 5823." The cathodes of these various tubes are connected directly to a ground line 136. On the other hand, the anodes of the various tubes $135^1$ to $135^8$ are connected, respectively, in circuit with the aforementioned latch control magnets 108, 107, 105, and 106. The latter are connected in common through a delay circuit including a resistor 138 and condenser 139, connected in parallel, and through normally closed contacts 140, operable by the aforementioned actuator slide operated blade 125, to the conductor 131 of positive potential.

Bias resistors, like resistors 142 and 143, are connected in the cathode-igniter circuit and in the igniter-anode circuits of the various tubes $135^1$ to $135^8$ to normally bias the igniters of the respective tubes to a sufficient potential below its firing point to insure proper operation.

A scanning circuit is provided to sequentially energize relays 130*a* to 130*d* so as to successively enter the digital values registered by the different counter decades into the machine, through the electromagnets 105 to 108.

The operating coils of the various relays 130*a* to 130*d* are connected in series with the ground line 136 and cathodes of thyratron type tubes 144 to 147, respectively. The anodes of these various tubes, except the tube 144 associated with the units relay 130*a* are connected to the positive potential conductor 131 through normally closed contacts located in the next succeeding relay of the series. For example, the anode of tube 147 is connected through lead 148 and normally closed contacts 150 of relay 130*c* to conductor 131. The anode of tube 146 is connected through normally closed contacts 250 of relay 130*b* to conductor 131. The anode of the last tube 144 of the series is connected however by a lead 151 to the juncture point 152 of the resistor-condenser combination 138 and 139.

Bias resistors 153 and 154 are located between the igniter and cathode and between the igniter and anode, respectively, of the first thyratron tube 147 of the series to normally maintain the potential of the igniter safely below the firing point, thus normally maintaining the tube in a non-conducting condition.

The succeeding tube 146 is also normally held in a nonconductive condition by biasing resistors 155 and 156. The former resistor is connected between the igniter of this tube and a negative potential supply line 157. The resistor 156 is connected between the igniter and a point 158 at the upper end of the coil of relay 130*d*. The remaining tubes 145 and 144 are similarly maintained in normally non-conducting conditions.

The igniters of the tubes 146, 145 and 144 are connected through coupling condensers, like condenser 160, to a pule line 161 which is connected through normally open contacts 162 to a source 163 of positive potential. The contacts 162 are closed by deflection of the blade 125 upon release of any one or more of the actuator slides as was described hereinbefore. Normally, however, the bias applied to the igniters of the tubes 144, 145, and 146 through the resistors, like resistor 155, is sufficient to prevent a positive pulse from being transmitted through the condensers, like condenser 160, to fire the respective tubes when the contacts 162 are closed by release of an actuator slide.

In order to effect a read-out operation to transfer amounts from the counter into the machine and to accumulate and print such amounts, the tube 147 is fired by applying a positive pulse through a coupling capacitor 165 to the igniter of such tube, such pulse being of an amplitude sufficient to overcome the bias applied to the igniter. Conduction of tube 147 will close the relay 130*d*, thus connecting the output leads $16^1$, $16^2$, $16^4$ and $16^8$ from the highermost order decade 16 of the counter to the igniters of the various control tubes $135^1$ to $135^8$, respectively, thereby energizing appropriate ones of the latch releasing magnets 105 to 108.

Due to the rise in potential of the point 158, upon firing of the tube 147, the biasing potential across the next succeeding tube 146 will be raised to a level such that as the contacts 162 close, the resultant positive pulse applied to the igniters of the various tubes 146, 145 and 144 will be effective to fire only the tube 146, thereby energizing relay 130*c*. The contacts 150 will now break to extinguish the tube 147 and thus deenergize the relay 130*d*. The output leads of the decade 15 will now be connected to the igniter of the tubes $135^1$ to $135^8$ to energize the appropriate ones of the latch releasing magnets and thus effect setting of the appropriate stop pins in the pin carriage. Consequently, the level of the bias applied to the igniter of tube 145 will be raised to such a point that as the contacts 162 subsequently close, tube 145 will fire to close its respective relay 130*b* and thereby effect opening of the preceding relay 130*c*.

The above series of events will be repeated until relay 130*a* is closed to transfer data from the units decade 13 into the machine.

Included in the relay 130*a* is a movable contact 166 connected through a condenser 167 to the ground line 136. This contact normally engages a contact 168 which is connected through lead 170 and the coil of a relay 171 and resistor 172 to ground line 136.

Normally open contacts 173 of the relay 171 are located in a power circuit including a solenoid 174 which is effective, through means not shown, to initiate a cycle of operation of the machine 20.

When the relay 130*a* is energized, the contact 166 is engaged with a contact 175 which is connected through lead 176 to the positive potential conductor 131, thereby charging the condenser 167. After appropriate ones of the magnets 105 to 108 have been energized to release respective ones of the actuator slides, the contacts 140 will be opened, as described previously, thereby opening the circuit to the anode of tube 144 to deenergize the relay 130*a*. Consequently, the contacts 166—168 will complete a circuit from the condenser 167 to the coil of relay 171 to close the relay contacts 173. The solenoid 174 will now be energized, causing a cycle of operation of the machine to transfer amounts entered therein into the accumulator and to print such amounts.

FIG. 9 illustrates an alternative form of the invention wherein information may be transferred into the machine from a punched tape 178, in lieu of an electronic counter.

Data is recorded in a binary form in the tape and the latter is fed in a suitable manner either continuously or intermittently over a fixed guide 179 of insulating material having a conductor strip 180 embedded therein. The strip 180 is connected to a source of positive potential 181.

Five stationary brushes 182 to 186, inclusive, engage the tape and are adapted to enter the holes, i.e. hole 187, in the tape as the latter passes over the guide 179.

The brushes 182 to 185 are connected in circuit with the latch release magnet 106, 105, 107 and 108, respectively, the latter in this case being connected directly to a ground connection 188.

The brush 186 is connected through a lead 189 to the machine cycle initiating solenoid 174. Therefore, as an appropriate hole, i.e. 190, in line with the brush 186, passes thereunder, a circuit will be completed through the solenoid 174 to initiate a read-out cycle of the machine.

Although I have described my invention in detail in its preferred and modified embodiment and have therefore utilized certain specific terms and languages herein, it is to be understood that the present disclosure is illustrative rather than restrictive and that changes and modifications may be made without departing from the spirit or scope of the claims appended hereto. For example, the read-out system could be utilized to read-out from other forms of coded information sources such as electronic computers, analog-to-digital converter devices, punched merchandise tags or tokens, etc. Also, by appropriate modification, the system can be utilized to translate other types of coded information into decimal notation.

Having thus described the invention, what I desire to secure by United States Letters Patent is:

1. An amount registering system comprising the combination with a digit registering machine of the ten key type including independently operable elements for sequentially entering digit representations into said machine, said elements being effective to enter the digit representations from 0 to 9, respectively; of actuating devices for respective ones of said elements, spring means for independently actuating said devices, a plurality of permutation latches, each of said latches being effective to normally latch certain only of said devices against operation by said spring means, means for releasing one or more of said latches, and means controlled by one of said devices upon actuation thereof by said spring means for relatching said actuating devices by said previously released latches.

2. An amount registering system comprising the combination of a digit registering machine of the ten key type including independently operable elements for entering amounts into said machine, said elements being effective to enter representations of the digits ranging from 0 to 9, respectively; of actuating devices for respective ones of said elements, spring means for independently actuating said devices, a plurality of permutation latches, each of said latches being effective to normally latch certain only of said devices from operation by said spring means, a plurality of digit representing circuits effective singly or in combination to represent different ones of said digits, electromagnetic means controlled by said circuits for releasing respective ones of said latches, means for concommitantly completing certain of said circuits, and means controlled by one of said devices upon actuation thereof by said spring means for thereafter relatching the same by said latches.

3. An amount registering system comprising the combination with a digit registering machine of the ten key type including independently operable amount entering devices for entering digit representations into said machine, said devices being effective to enter the digit representations ranging in value from 0 to 9, respectively; of actuating devices for respective ones of said amount entering devices, spring means for independently actuating said actuating devices, a plurality of permutation latches, each of said latches being effective to normally latch certain only of said actuating devices from operation by said spring means, means for selectively releasing certain only of said latches at any one time, electromagnetic means for returning any released ones of said devices to latched condition, a normally open circuit for said electromagnetic means, and a switching device operable by any one of said actuating devices upon release thereof for completing said circuit.

4. An amount registering system according to claim 3 comprising a device effective to delay operation of said last mentioned electromagnetic means.

References Cited in the file of this patent

UNITED STATES PATENTS

| | | |
|---|---|---|
| 2,434,500 | Leathers et al. | Jan. 13, 1948 |
| 2,770,415 | Lindesmith | Nov. 13, 1956 |
| 2,772,048 | Collison et al. | Nov. 27, 1956 |

FOREIGN PATENTS

| | | |
|---|---|---|
| 690,171 | Great Britain | Apr. 15, 1953 |